(12) United States Patent
Contrucci et al.

(10) Patent No.: US 6,517,603 B2
(45) Date of Patent: Feb. 11, 2003

(54) METHOD FOR RECOVERY OF METALS HAVING LOW VAPORIZATION TEMPERATURE

(75) Inventors: Marcos de Albuquerque Contrucci, Rio de Janeiro (BR); Pedro Henrique Carpinetti Costa, Santa Catarina (BR); Edmar Saul Marcheze, Santa Catarina (BR)

(73) Assignee: Startec Iron LLC, Edina, MN (US)

( * ) Notice: Subject to any disclaimer, the term of this patent is extended or adjusted under 35 U.S.C. 154(b) by 0 days.

(21) Appl. No.: 09/811,428

(22) Filed: Mar. 20, 2001

(65) Prior Publication Data

US 2002/0134199 A1 Sep. 26, 2002

(51) Int. Cl.[7] .............................................. C21B 11/00
(52) U.S. Cl. .............................. 75/381; 75/386; 75/499; 75/665
(58) Field of Search ......................... 75/380, 381, 468, 75/499, 665, 386; 266/87

(56) References Cited

U.S. PATENT DOCUMENTS 3,652,069 A * 3/1972 Worner .......................... 75/499
5,279,643 A * 1/1994 Kaneko et al. ................ 75/499

* cited by examiner

*Primary Examiner*—Melvyn Andrews
(74) *Attorney, Agent, or Firm*—Finnegan, Henderson, Farabow, Garrett & Dunner LLP

(57) ABSTRACT

A method for reducing metal oxides in a shaft furnace. A charge of metal oxide and a reductant is reacted in the furnace to produce a primary metal of the metal oxide and an additional secondary metal. The temperature of the off gas from the reaction is controlled to prevent condensing of the secondary metal so that it remains in the off gas for separation therefrom.

22 Claims, 5 Drawing Sheets

METHOD FOR RECOVERY OF METALS HAVING LOW VAPORIZATION TEMPERATURE

BACKGROUND OF THE INVENTION

The present invention relates to a method for the production of molten metal by reduction of oxides of the metal. This includes production of molten iron, including pig iron and cast iron, as well metal alloys.

Reduction processes are intended to either produce steel directly from iron ore or make a product equivalent to blast furnace pig iron for use in conventional steel making processes, or produce low-carbon iron as a melting stock for producing steel by conventional processes. This process is generally intended to supplant blast furnaces as a source of molten iron production for steel making.

Blast furnaces typically constitute a vertical tower wherein a charge comprising iron ore, pellets or agglomerates, together with coke and limestone, are sequentially charged through the top of the furnace to form a continuous column of charge material. In the lower portion of the furnace, atmospheric air, which may be preheated, is introduced to the charge. When the charge materials come into contact with hot gases that are ascending from the hearth, the coke is preheated by these gases so that when it reaches the lower portion of the furnace and it comes into contact with the air introduced thereto, it will be caused to burn. At the resulting high temperatures existing at this location of the furnace, carbon dioxide is not stable and reacts immediately with carbon to form carbon monoxide. This reaction is not only the main source of heat for the smelting operation, but it also produces a reducing gas (CO) that ascends through the furnace where it preheats and reduces the iron oxide in the charge as it descends through the furnace.

The production capacity of a blast furnace is a function of the internal volume or area of the furnace design parameters for a given production capacity. Consequently, to increase capacity requires increasing the size of the blast furnace and accordingly adjusting the design parameters.

SUMMARY OF THE INVENTION

The present invention provides improvement over the above-described conventional blast furnace operation in the production of molten metal, particularly molten iron. Specifically, the method in accordance with the invention is used in association with a shaft furnace that may produce cast iron, pig iron or other metal alloys in a more cost effective manner than the use of conventional smelting operations, including blast furnaces.

The invention provides further advantage in allowing the conservation of fine materials from the top gases in the form of oxides of metals, such as zinc, cadmium and the like and permits the recovery and recycling of these metals and oxides.

The method for reducing metal oxides in accordance with the improvement of the present invention provides advantages over the conventional practices by the novel use of a shaft furnace for smelting. In this regard the method comprises reacting a charge of a metal oxide and a reductant to produce a primary molten metal of the metal oxide and gas containing carbon monoxide and an additional secondary metal and oxides, which are different than the primary molten metal and metal oxides. The gas is directed upwardly in the shaft furnace and away from this charge. The temperature of the gas is controlled at a location in the shaft furnace above the charge to be at a temperature that is higher than the condensing temperature of the secondary metal and oxides. This prevents the secondary metals and oxides in the gas from adhering to the interior wall of the shaft furnace. Thereafter as the gas passes upwardly and is removed from the furnace the secondary metal and oxides are removed from the gas. These may then be recycled in various ways, including using the same in the production of agglomerates for use in a charge to be refined.

The temperature of the gas may be controlled by varying the height of the charge within the shaft furnace. In addition the temperature of the gas may be controlled by varying the combustion rate of the gas by using a burner to heat the gas as the gas is directed upwardly within the shaft furnace.

The temperature of the gas may be additionally controlled by controlling the reaction rate of the charge.

The gas removed from the furnace consists essentially carbon dioxide and nitrogen.

The charge may include iron ore. In addition, the charge may include agglomerates that are self-reducing, self-fluxing, or both.

In conventional reduction practices, the reduction occurs by means of the CO generated from the partial combustion of the coke. The CO spreads into the charge with the reduction taking place according to the reaction Me+CO Me+$CO_2$. The $CO_2$ gas generated in this reaction spreads in the opposite sense to the CO. This reaction requires a certain amount of time for the complete diffusion inside the charge. This requires furnaces with periods of residence times for the charge inside the furnace, which is typical of blast furnaces.

Self-reducing agglomerates, however, exhibit conditions that are significantly more favorable for reduction. The more intimate contact between the ore or the oxide and the carbon of the reductant (coal or coke) allows a shorter reaction time since there is no need for spreading the CO into the agglomerate. The reduction occurs according to the reactions below, and is preset within the agglomerate for this purpose:

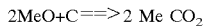

2MeO+C ==> 2 Me $CO_2$

$CO_2$+C ==> 2 CO

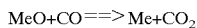

MeO+CO ==> Me+$CO_2$

The agglomerate itself thus establishes in practice a semi-closed system, wherein the atmosphere is a reducing atmosphere, during the entire period when carbon is available within the agglomerate. In other words, the self-reducing agglomerates, as implied by such designation, maintain within the same their own reducing atmosphere that is independent from the characteristics of the outer atmosphere, that is the atmosphere existing inside the shaft furnace provided by the ascending gasses.

It is therefore possible to convert into energy for the process the CO present in the atmosphere of the furnace provided by the partial burning of the fuel and the reducing reaction that takes place within the agglomerates and additionally allowing control of the temperature and the characteristic (oxidizing or reducing) of the top gasses.

In melting processes using shaft furnaces, the presence of coke or another fuel in solid form, charged through the top part of the furnace during the course of the operation, follows a descending path with the rest of the charge, reacting with the ascending $CO_2$, in counter current relationship according to the reaction $CO_2+C ==> 2CO$. This results in a greater consumption of carbon material, and thus prevents effective utilization thereof for the process of reducing/melting.

Due to the short residence time required for the self-reducing process in accordance with the invention, it is possible to operate the furnace according to the present invention with low charge heights. It is also possible to control the exhaust temperature of the top gasses and hence maintain in the form of vapor or fine particulate the oxides or metals that contaminate the residue used in the agglomerates. Hence, this material may be recovered at the gas scrubbing system. Because reduction of the content and the nonmetallic present in the residue, the fines recovered at the gas scrubbing system exhibit high concentrations of these oxides and metals, such as for example above 20%, rendering the subsequent recovery thereof economically feasible. Where the concentration of the oxides or metals is not found to have reached the desired level for economical recovery, it is possible to recycle these fines as many times as necessary by including the same in the production of the self-reducing agglomerates to increase the content thereof in the agglomerates and thus increase the concentration thereof in the recovered fines.

DETAILED DESCRIPTION OF THE PREFERRED EMBODIMENTS

The furnace according to the present invention permits control of the exhaust temperature of the hot gasses through the greater or lesser burning rate of the combustible gasses provided from the lower regions and the reduction of the oxides present in the agglomerates. In this manner, it is possible to maintain in the vapor or fine particulate state the metals and oxides present in the raw agglomerates. This includes materials having vaporization temperatures below 1,000° C., such as Zn, Cd, and Pb, which would otherwise condense on the walls of the furnace.

Figure 4:
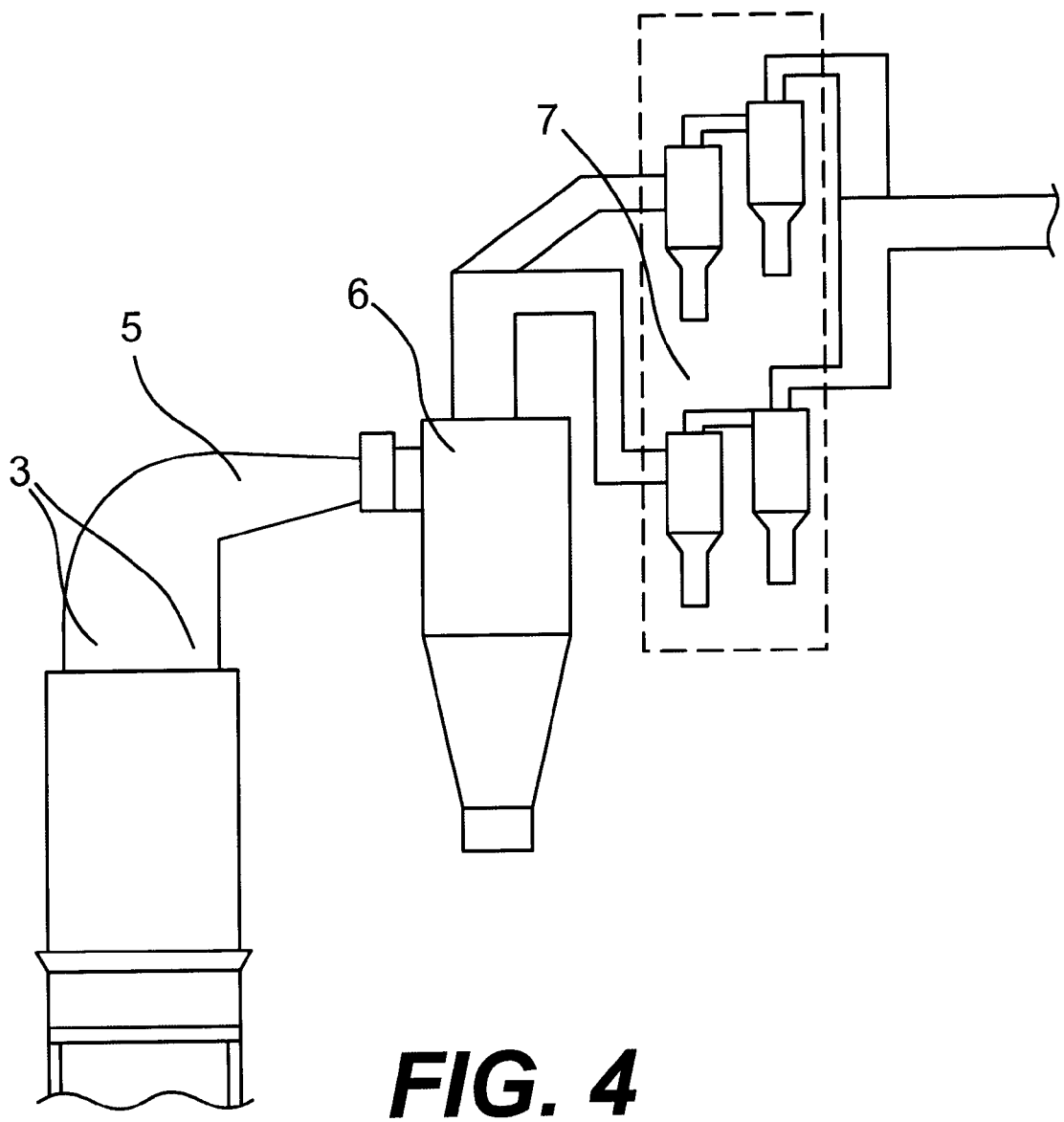
FIG. 4 illustrates a gas scrubbing system capable of retaining the metals vaporized inside the furnace and the fines of metal oxides that leave the furnace together with the top gasses.
Figure 5:
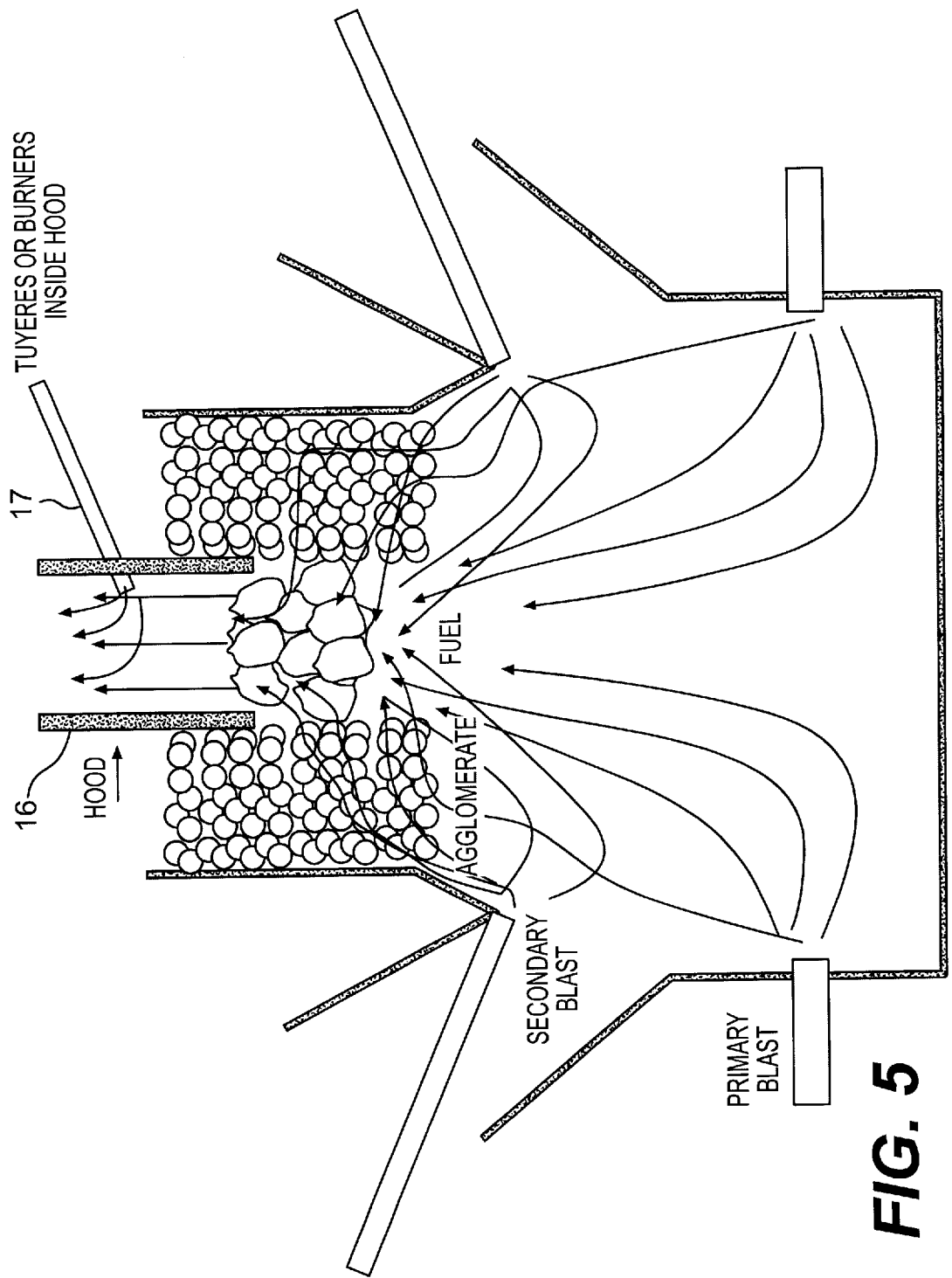
FIG. 5 is a cross sectional view of a hood structure containing burners for controlling combustion of the off gas from the furnace.

Therefore, the hot gasses at high temperatures and containing the vapor of the contaminant metals or the oxides thereof in the form of fine particles are exhausted from the furnace and, as shown in FIG. 4, through the gas outlet 3 into the gas scrubbing system, wherein there occurs, at the separating devices 6 (for example, cyclone or precipitator type devices), the condensing of those vapors and the separation thereof, together with the remaining fines, from the top gasses, that follow a course through the remaining portion of the gas scrubbing system 7.

The fines captured in these separators 6 have concentrations above 20% of contaminant metals or oxides due to the decrease in the rate of iron present in the raw materials, rendering the recovery thereof economically feasible.

Should the amount of residue containing contaminants fail to be sufficient to ensure an economically feasible concentration of these metals or oxides, it is possible to operate the furnace of the instant invention by charging the agglomerates containing these contaminants only at one sector of the furnace, such as for example to one of the ends thereof, and to withdraw and separate these metals prior to the complete mixture of the top gasses of the rest of the furnace in order to provide the concentration thereof at economically feasible levels.

Figure 1:
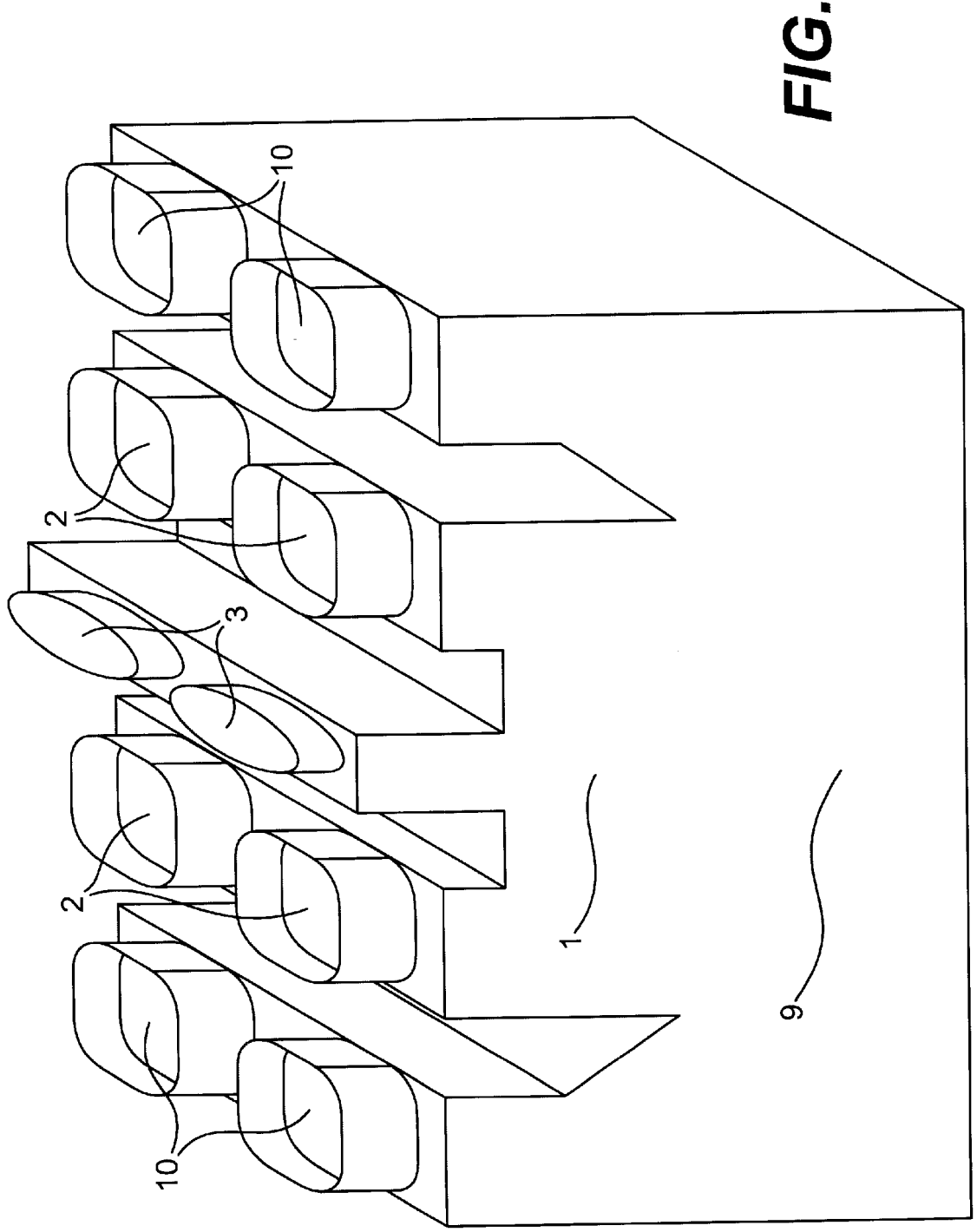
FIG. 1 is a schematic partial perspective view of one embodiment of equipment for practicing the present invention.
Figure 2:
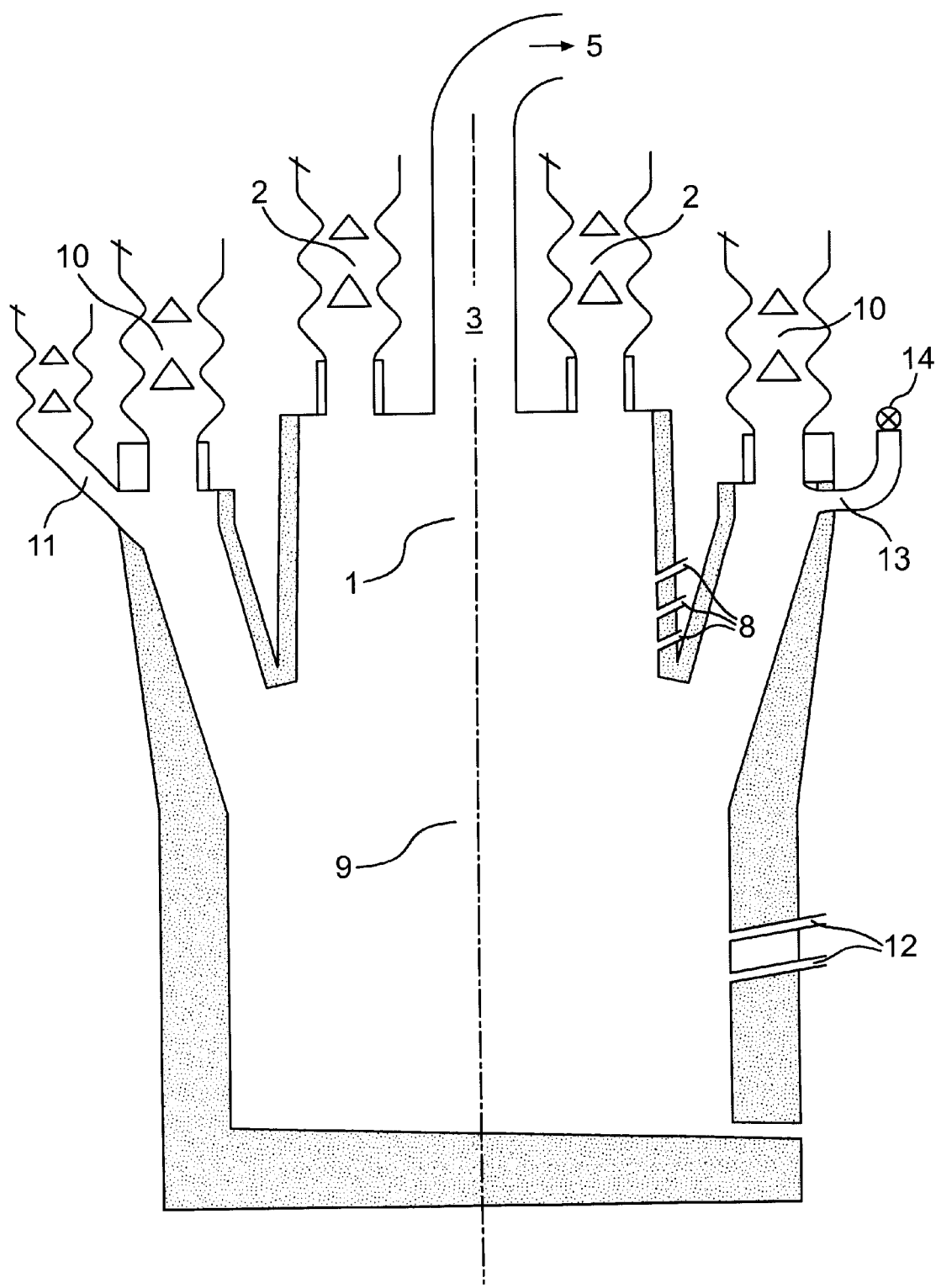
FIG. 2 is an elevation view of the equipment of FIG. 1.
Figure 3:
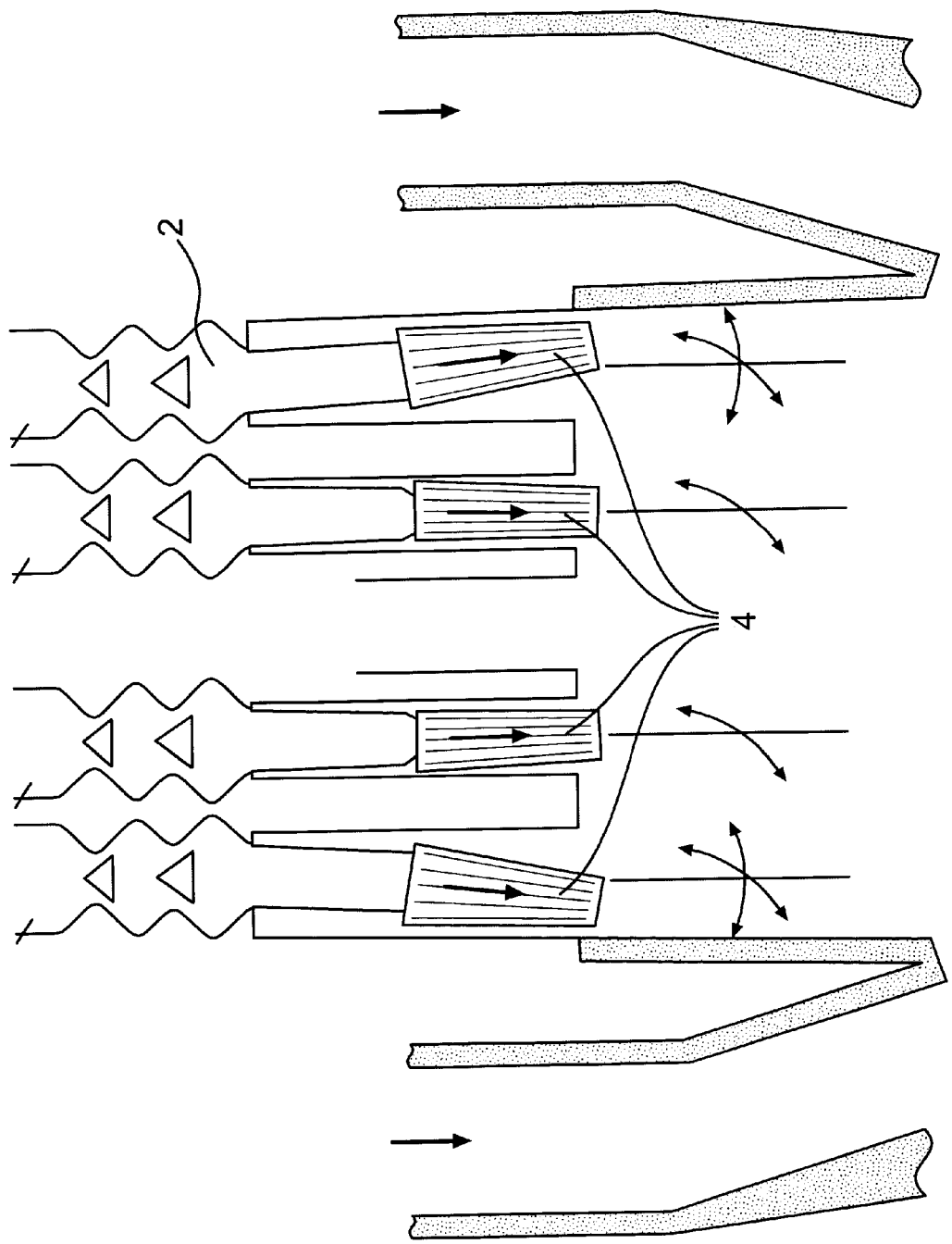
FIG. 3 is a cross-sectional view showing the charge distribution devices of this equipment.

That novel furnace construction, as shown in FIGS. 1 to 3, is essentially comprised of an upper shaft 1, cylindrical or conical, having a rectangular cross sectional shape including at the upper part thereof a charging device or devices including port(s) 2, provided with charge distributing devices 4 to allow the positioning of the agglomerates or charge in proper positions inside the furnace to concentrate the agglomerates that contain the metals or oxides that are intended to be concentrated. A gas outlet or outlets 3 for discharging gasses comprising mainly various contents of $CO_2$, $CO$, $H_2$, and $N_2$, in addition to the fines produced by the disintegration of the charge. The vapors or oxides in the form of particulate may flow along ducts 5 to the gas scrubbing system 7 and the separator devices for fines 6 that retain the condensed particulate of metal or oxides. The gasses are thereafter conveyed to the recovering devices or heat regenerators (not shown), to preheat the blowing air or for any other purpose.

In the upper shaft 1 there is a row or rows of tuyeres 8 that blow hot or cold air, either enriched with $O_2$, or not thus enriched, for the burning reaction of CO and any other combustible gasses that may be present, to carbon dioxide according to the reactions:

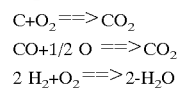

supplying heat to the charge constituted by self-reducing agglomerates, ore or iron oxides and residue containing iron and contaminants, and being self-fluxing or not, pig, scrap, sponge iron, either in the form of briquettes or otherwise, foundry or steel plant scrap, or mixtures of those components in the various possible proportions.

The equipment or furnace also includes a lower shaft 9, of cylindrical or conical shape, with a rectangular cross sectional shape, having larger sides at the upper part thereof than the upper shaft 1, sufficient for the positioning of feed devices to feed coke or coal or any other solid fuel. Around the lower shaft 9, at a level sufficiently higher than the base of the upper shaft 1, there is provided a continuous fuel feed section, as shown in FIG. 2, this section being fed by piping or other feed sections fed by tight valves 10 for solid fuel. Optionally, independent pipes 11 to feed additional combustible materials may be added to the solid fuels feed section to provide a proper feeding of the fuel bed, especially of fine materials that might otherwise be drawn by the gasses from the central upper shaft 1, or of combustible materials such as used tires, plastics, etc.

The lower shaft 9 includes one or more rows of primary tuyeres 12 positioned to blow preheated or not preheated air, either enriched with $O_2$ or not, and to inject liquid, gaseous or solid powdered fuels for partial or total burning of the fuel, providing the thermal energy required to reduce and/or melt the charge. The upper shaft 1 and the lower shaft 9 may include a monolithic refractory material (shown in cross-hatched lines in FIGS. 3 and 4) and may further include cooling means.

The fused metal and the slag leave the furnace through the lower part thereof.

The fuel in this type of furnace need not be added together with the charge at the top of the shaft as in conventional practices.

This furnace provided with such improvements has distinct atmosphere zones, with characteristics that may be regulated by means of the type of fuel employed and the greater or lesser injection of comburent at the various points provided for that purpose. It is thereby possible, depending of the oxidizing potential by $CO_2$ of the metal to be recovered and the characteristic (oxidizing or reducing) of the atmosphere prevalent inside the furnace, to recover that metal in oxidized or metallic form.

The gasses coming from the lower zone, flowing back against the charge, transfer to the latter the thermal energy required for heating and reducing or simple melting.

Since the charge in the upper shaft 1 does not contain significant amounts of coke, charcoal or other solid fuel, the Boudouard reaction, $CO_2+C==>2CO$, which absorbs heat and which in addition consumes considerable amounts of carbon, is minimized. Thus, the exhaust gasses that leave the equipment are comprised essentially of $CO_2$ and $N_2$. However, in operating modes variable rates of CO capable of providing a reducing characteristic to the top gas and sufficient heating power to be used for preheating the blowing air or in other parts of the plant may be used.

Since it is possible to control the atmosphere within the furnace as well as the temperature of the top gasses, it is possible in this furnace to avoid the accumulation of metals and/or oxides entrained in the off gas on the inner walls of the furnace as typically occurs in the case of cupola furnaces and blast furnaces.

The method of the present invention allows great flexibility in operation enabling the melting of scrap (including scrap containing high rates of contamination of other metals besides iron, such as, for example, zinc), pig iron, sponge iron or any other type of pre-reduced material, which may be in the form of briquettes.

This shaft furnace thus operated in accordance with the method of the invention presents the advantage over the cupola furnace or blast furnace of providing great fuel economy, since the carbon monoxide or other gasses formed in the lower part of the furnace may be burned at the upper part. This transfers the thermal energy yielded during the reaction to the charge descending through the shaft. The exhaust gasses are formed essentially by carbon dioxide, nitrogen, water vapor and controlled amounts of carbon monoxide, hydrogen and hydrocarbons.

This shaft furnace also may be operated in accordance with the invention for reducing and melting of self-reducing agglomerates of ore or industrial residue with or without metallic contaminants that may be recovered as vapor or fines of the oxides thereof from the top gasses. Also in this case, the carbon monoxide that is formed is burned along the shaft, and the heat thereby generated is almost entirely transferred to the descending charge, thereby considerably increasing the thermal efficiency of the equipment. Additionally, since the equipment does not include layers of coal or coke or other solid fuels in the charge of the shaft, the reaction $CO_2+C==>2CO$ does not occur to provide a reduction of fuel consumption.

The solid fuel feeding section is also provided with a gas removal device 13 equipped with flow control valves 14 capable of ensuring the passage of a certain amount of the gas to provide preheating, predrying and distillation of volatile fractions present in various solid fuels, such as mineral coal, firewood, and/or various carbonaceous residue.

To regulate and increase the temperature of the off gas to prevent condensing of metal deposits the hood 16 of the furnace may have a burner to heat this gas.

What is claimed is:

1. A method for reducing metal oxides in a shaft furnace comprising:

reacting in said shaft furnace a charge comprising a metal oxide and a reductant to produce a primary molten metal of said metal oxide and gas containing carbon monoxide and an additional secondary metal and oxide different than said primary molten metal;

directing said gas upwardly in said shaft furnace and away from said charge;

controlling temperature of said gas at a location in said shaft furnace above said charge to be higher than a condensing temperature of said secondary metal and oxide to prevent said secondary metal and oxide from adhering to an interior wall of said shaft furnace, wherein said temperature is controlled by varying a height of said charge within said shaft furnace;

thereafter removing said gas from said shaft furnace; and separating said secondary metal and oxide from said gas removed from said shaft furnace.

2. The method of claim 1, wherein said temperature of said gas is additionally controlled by varying a rate of combustion of said gas by using a burner to heat said gas as said gas is directed upwardly within said shaft furnace.

3. The method of claim 1, wherein said temperature of said gas is additionally controlled by controlling a rate of said reacting of said charge.

4. The method of claim 1, wherein said gas removed from said furnace consists essentially of carbon dioxide and nitrogen.

5. The method of claim 1, wherein said separated secondary metal and oxides are recycled for use in a subsequent charge for reaction.

6. A method for reducing metal oxides in a shaft furnace comprising:

reacting a charge comprising a metal oxide and a reductant to produce a primary molten metal of said metal oxide and gas containing carbon monoxide and an additional secondary metal and oxide different than said molten metal, said charge including agglomerates comprising said metal oxide and said reductant;

directing said gas upwardly in said shaft furnace and away from said charge;

controlling temperature of said gas at a location in said shaft furnace above said charge to be higher than a condensing temperature of said secondary metal and oxide to prevent said secondary metal and oxide from adhering to an interior wall of said shaft furnace, wherein said temperature is controlled by varying a height of said charge within said shaft furnace;

thereafter removing said gas from said shaft furnace; and separating said secondary metal and oxide from said gas removed from said shaft furnace.

7. The method of claim 6, wherein said temperature of said gas is additionally controlled by varying a rate of combustion of said gas by using a burner to heat said gas as said gas is directed upwardly within said shaft furnace.

8. The method of claim 6, wherein said temperature of said gas is additionally controlled by a rate of said reacting of said charge.

9. The method of claim 6, wherein said gas removed from said furnace consists essentially of carbon dioxide and nitrogen.

10. The method of claim 6, wherein said separated secondary metal and oxide are recycled for use in a subsequent charge for reaction.

11. A method for reducing metal oxides in a shaft furnace comprising:

reacting a charge comprising a metal oxide, a reductant and a fluxing agent to produce a primary molten metal of said metal oxide and gas containing carbon monoxide and an additional secondary metal and oxide different than said molten metal;

directing said gas upwardly in said shaft furnace and away from said charge;

controlling temperature of said gas at a location in said shaft furnace above said charge to be higher than a condensing temperature of said secondary metal and oxides to prevent said secondary metal and oxide from adhering to an interior wall of said shaft furnace, wherein said temperature is controlled by varying a height of said charge within said shaft furnace;

thereafter removing said gas from said shaft furnace; and separating said secondary metal and oxides from said gas removed from said shaft furnace.

12. The method of claim 11, wherein said temperature of said gas is additionally controlled by varying a rate of combustion of said gas by using a burner to heat said gas as said gas is directed upwardly within said shaft furnace.

13. The method of claim 11, wherein said temperature of said gas is additionally controlled by a rate of said reacting of said charge.

14. The method of claim 11, wherein said gas removed from said furnace consists essentially of carbon dioxide and nitrogen.

15. The method of claim 11, wherein said separate secondary metal and oxides are recycled for use in a subsequent charge for reaction.

16. A method for reducing metal oxides in a shaft furnace comprising:

reacting charge comprising an iron oxide and a reductant to produce molten iron from said iron oxide and gas containing carbon monoxide and an additional secondary metal and oxide different than said molten iron;

directing said gas upwardly in said shaft furnace and away from said charge;

controlling temperature of said gas at a location in said shaft furnace above said charge to be higher than a condensing temperature of said secondary metal and oxides to prevent said secondary metal and oxide from adhering to an interior wall of said shaft furnace, wherein said temperature is controlled by varying a height of said charge within said shaft furnace;

thereafter removing said gas from said shaft furnace; and separating said secondary metal and oxides from said gas removed from said shaft furnace.

17. The method of claim 16, wherein said temperature of said gas is additionally controlled by varying a rate of combustion of said gas by using a burner to heat said gas as said gas is directed upwardly within said shaft furnace.

18. The method of claim 16, wherein said temperature of said gas is additionally controlled by varying a height of said charge within said shaft furnace.

19. The method of claim 17, wherein said temperature of said gas is additionally controlled by a rate of said reacting of said charge.

20. The method of claim 16, wherein said gas removed from said furnace consists essentially of carbon dioxide and nitrogen.

21. The method of claim 16, wherein said separated secondary metal and oxides are recycled for use in a subsequent charge for reaction.

22. The method of claim 16, wherein said charge includes agglomerates comprising an iron oxide and at least one of a reductant and a fluxing agent.

* * * * *